United States Patent [19]
Hara et al.

[11] Patent Number: 5,630,158
[45] Date of Patent: May 13, 1997

[54] CENTRAL PROCESSING UNIT INCLUDING INHIBITED BRANCH AREA

[75] Inventors: Kazuhiko Hara, Sanda; Shinichi Yamaura, Kobe; Keiichi Yoshioka, Sanda; Takao Katayama, Ikeda, all of Japan

[73] Assignee: Ricoh Company, Ltd., Tokyo, Japan

[21] Appl. No.: 361,936

[22] Filed: Dec. 22, 1994

[30] Foreign Application Priority Data

Dec. 22, 1993 [JP] Japan ................................ 5-323813

[51] Int. Cl.$^6$ .............................................. G06F 9/00
[52] U.S. Cl. .................... 395/800; 395/571; 364/DIG. 1; 364/261.3; 364/262.4; 364/247; 364/259; 364/259.9
[58] Field of Search ........................ 395/800, 550, 395/375

[56] References Cited

U.S. PATENT DOCUMENTS

4,755,933  7/1988  Teshima et al. .................... 395/484
5,051,885  9/1991  Yates, Jr. et al. .................... 395/375
5,424,969  6/1995  Yamada et al. ..................... 364/736

*Primary Examiner*—Mehmet B. Geckil
*Attorney, Agent, or Firm*—Cooper & Dunham LLP

[57] ABSTRACT

A central processing unit includes an instruction register storing instruction codes, a timing control unit controlling timings of steps of execution of an instruction, an execution unit executing an operation on data and temporarily storing data, the execution unit having a program counter and a data bus, a decoder decoding instruction codes read from the instruction register and controlling the instruction register, the timing control unit and the execution unit, and a next enable unit receiving an indication signal indicating proceeding to a next instruction should be performed and controlling outputting of the indication signal to the instruction register and the timing control unit based on first and second signals. The first signal is supplied from the decoder and instructing data on the data bus to be input to the program counter. The second signal is supplied from the execution unit and indicating whether a counter value of the program counter is an odd number or an even number.

5 Claims, 6 Drawing Sheets

CENTRAL PROCESSING UNIT INCLUDING INHIBITED BRANCH AREA

BACKGROUND OF THE INVENTION

1. Field of the Invention

The present invention generally relates to central processing units, and more particularly to a central processing unit which has an inhibited area which is not allowed to become a branch destination, and the operation of the central processing unit is immediately shifted to an exception process when the operation is attempted to branch to the inhibited area.

2. Background of the Invention

A central processing unit (hereinafter simply referred to as a CPU) sequentially reads and executes instructions from a memory device in which a group of instructions are stored as a program. Hereinafter, such as memory device is simply referred to as a memory.

Generally, data equal to one byte consisting of eight bits is assigned one address. When the CPU has a 16-bit data bus serving as a data transmission path, data or an instruction equal to two bytes can be accessed at one time. At this time, the CPU specifies two addresses to the memory. However, generally the CPU is equipped with a single address bus used to specify the address. Hence, the single address bus is used so that two consecutive addresses equal to two types in total are specified in such a way that one of the two consecutive addresses has the least significant bit of "0" and the other address has the least significant bit of "1". The other bits of the two consecutive addresses are the same as each other. Hence, two bytes to be accessed are two consecutive bytes starting from an even address, and the address specified by the CPU is such an even address.

When two bytes starting from an odd address should be accessed, the odd address and the subsequent even address cannot be simultaneously accessed. That is, the access must be carried out twice. This reduces the time-efficiency. When taking into consideration the above matters, it is preferable, in view of efficiently, that data or an instruction equal to two bytes should be arranged so as to be accessed by an even address.

There is an improved CPU having a restriction such that instructions of a program are always arranged at even addresses in order to simultaneously read an instruction of two bytes when the instruction code length of the CPU having a data bus having a 16-bit width is equal to 16 bits. Such a CPU having the above restriction is, for example, CPU68000 manufactured by Motolora Inc. Generally, the above restriction is called an even alignment restriction and is widely employed in various CPUs.

The CPU having the even alignment restriction always reads the instruction from an even address. Hence, the program counter indicating the address of the instruction to be executed is always an even number. If the program counter is updated due to, for example, execution of a branch instruction and the updated counter value is an odd number, the CPU executes, as an exception process, a process for branching to an exception process routine. Since the above exception process is performed when the program counter is attempted to be updated with the odd address, it is always necessary to determine whether the updated value is an even number or an odd number when updating the program counter.

It is necessary to describe a microprogram controlling the operation of the CPU so that, in all cases where the program counter is updated, it is determined whether or not the updated counter value is an odd number, and that the CPU operation branches to the exception process routine in the microprogram when it is determined that the updated counter value is an odd number and the CPU operation shifts to a next process when it is determined that the updated counter value is an even number.

Another type of CPUs is known in which the whole address space accessible by the CPU is equally divided into two parts on the basis of whether the most significant bit of the address is "1" or "0". Further, there is provided a restriction such that some operation modes among a plurality of predetermined operation modes are not allowed to jump to one of the two half address spaces. If jumping to the jump-inhibited half address space is attempted under the above restriction, an exception process takes place. Hence, when updating the program counter in execution of an instruction in the jump-inhibited operation mode, it is necessary to refer to the most significant bit of the updated counter value and determine whether or not the most significant bit indicates the jump-allowed half address space.

Hence, it is necessary to describe a microprogram controlling the operation of the CPU so that, in all cases where the program counter is updated, it is determined whether or not the updated counter value indicates the jump-allowed half address space, and that the CPU operation branches to the exception process routine in the microprogram when it is determined that the updated counter value indicates the jump-inhibited half address space, and the CPU operation shifts to a next process when it is determined that the updated counter value indicates the jump-allowed half address space.

There is also known a CPU which is an improvement in the above CPU having the restriction regarding the two half address spaces. Such a CPU has a register in which an arbitrary value can be written and is always compared with the content of the program counter. When the comparison result does not meet (or meets) the predetermined condition, an exception process is carried out. In the other cases, the CPU executes the ordinary operation.

Even in the above case, it is necessary to describe a microprogram controlling the operation of the CPU so that, in all cases where the program counter is updated, it is determined whether or not the comparison results meets the predetermined condition, and that the CPU operation branches to the exception process routine in the microprogram when it is determined that the comparison result does not meet (or meets) the predetermined condition, and the CPU operation shifts to a next step when it is determined that the comparison result meets (or does not meet) the predetermined condition.

Figure 1:
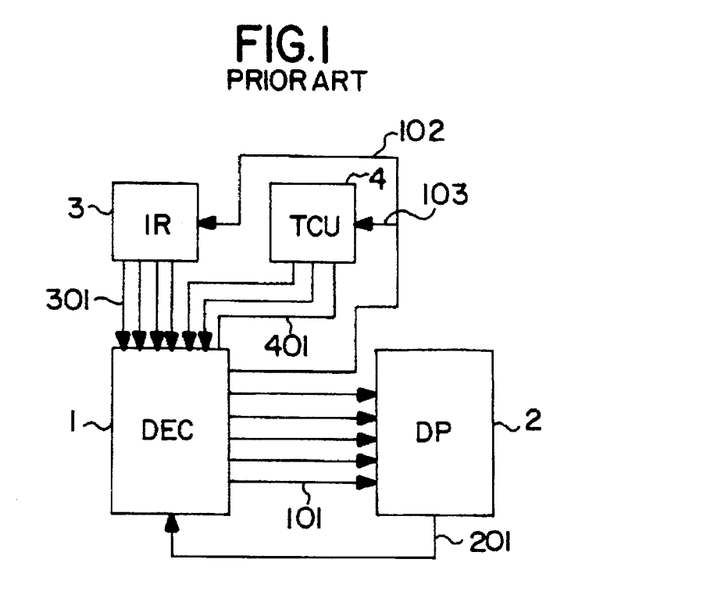
FIG. 1 is a block diagram of a conventional CPU.

The CPU described just above will now be described with reference to FIG. 1, which shows the structure of the above CPU. The CPU shown in FIG. 1 is made up of a decoder (DEC) 1, an execution unit (also referred to as a data path: DP) 2, an instruction register (IR) 3 and a timing control unit (TCU) 4. The decoder 1 is the main control part of the CPU and has input terminals connected to the output terminals of the instruction register 3 and the timing control unit 4. The output terminals of the decoder 1 are connected to the input terminals of the execution unit 2, the instruction register 3 and the timing control unit 4. The execution unit 2 executes operations on data and temporarily stores data.

The decoder 1 is supplied with information of an instruction code from the instruction register 3 and information of the execution step from the timing control unit 4. Then, the decoder 1 refers to a microprogram provided therein, and sends control signals 101 to the execution unit 2, a control signal 102 to the instruction register 2 and a control signal 103 to the timing control unit 4.

The execution unit 2 includes a program counter. When an odd program counter value is set in the program counter, the execution unit 2 informs the decoder 1 of the above set by means of a monitor signal 201. The instruction register 3 stores instruction codes, which are sent to the decoder 1 via signal lines 301. The instruction register 3 is updated to the next instruction code in response to the instruction by the control signal 102. The updating to the next instruction code is carried out when execution of the current instruction code is completed. The decoder 1 notifies the instruction register 3 of the above updating timing by means of the control signal 102.

The timing control unit 4 controls the execution step of the instruction. The decoder 1 is notified of the execution step by means of timing signals 401. The timing control unit 4 sets the first execution step of an instruction to "0" and then performs the sequential counting operation. However, the timing control unit 4 is capable of generating an arbitrary counter value for reasons of the microprogram. The timing control unit 4 is notified of the setting to an arbitrary counter value by means of the control signal 103 produced by the decoder 1. When execution of the current instruction is completed, the execution step specified by the timing control unit 4 is set to "0".

Figure 2:
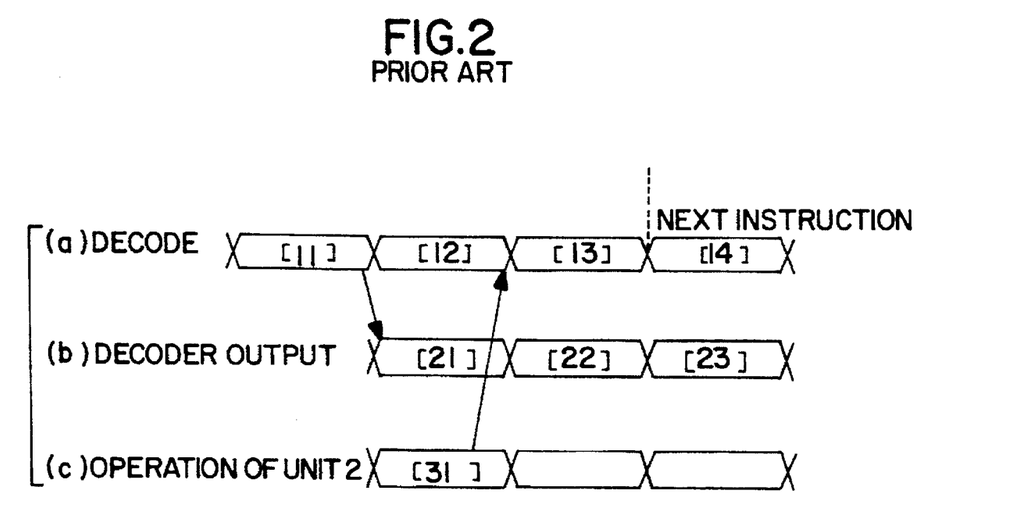
FIG. 2 is a timing chart of the operation of the conventional of CPU shown in FIG. 1.

FIG. 2 is a timing chart of the operation of the CPU shown in FIG. 1. It will now be assumed that there is a description in the microprogram such that, at an operation timing [11] shown in part (a) of FIG. 2, the address of a jump destination is stored to the program counter provided in the execution unit 2 via an internal data bus provided therein used to transmit data. The decoder 1 performs the decoding operation at the operation timing [11] in part (a) of FIG. 2, and outputs the decoder output at timing [21] of the decoder output signal shown in part (b) thereof. Hereinafter, the decoder output signal produced in the above-mentioned way is referred to as a control signal DB_PC. According to the control signal DB_PC at the timing [21], the execution unit 2 fetches the address of the jump destination available on the internal data bus provided therein. Then, the execution unit 2 notifies, by means of the control signal 201, the decoder of whether the address of the jump destination is an odd address or an even address. The decoder 1 receives the above notification, and selects a process in which the microprogram completes the instruction due to the normal jumping operation or another process in which the microprogram executes the exception process due to occurrence of the odd address.

There are two microprogram parts to be executed at the operation timing [13], one of the parts being executed upon the normal completion, and the other part being executed upon the exception occurrence. This is because information output by the executing unit 2 at the timing [31] can be processed by the decoding process executed at the timing [13]. In the normal completion, the decoder 1 instructs the instruction register 3 to update the instruction to the next one at the operation timing [13], and instructs the timing control unit 4 to set the counter value to "0". In the above way, decoding of the next instruction can be started at the timing [14] in the normal completion. Hence, the operation to be executed in the normal completion is carried out at the operation timing [13]. Hence, the fastest process is such that the control signal DB_PC is decoded at the timing [11] and the next instruction is processed at the timing [14].

As described above, it is determined whether the updated counter value is an odd number or even number each time the program counter is updated. That is, even when the updated counter value is an even number, the microprogram needs the steps of making the above decision. Hence, it takes a long time to execute the program. Further, the microprogram has a large load, which leads an increase in the size of the microprogram.

The CPU which determines whether the jump-allowed half address space is accessed has a disadvantage in that the microprogram provided therein needs the steps of making the above decision even when the jump-allowed half address space is accessed. Hence, it takes a long time to execute the program. Further, the microprogram has a large load, which leads an increase in the size of the microprogram.

The CPU which determines whether the comparison result meets (or does not meet) the predetermined condition has a disadvantage in that the microprogram provided therein needs the steps of making the above decision even when the comparison results meets (or does not meet) the predetermined condition. Hence, it takes a long time to execute the program. Further, the microprogram has a large load, which leads an increase in the size of the microprogram.

SUMMARY OF THE INVENTION

It is a general object of the present invention to provide a central processing unit in which the above disadvantages are eliminated.

A more specific object of the present invention is to provide a central processing unit having a reduced execution time and a reduced microprogram load.

These objects of the present invention are achieved by a central processing unit comprising:

an instruction register storing instruction codes;

a timing control unit controlling timings of steps of execution of an instruction;

an execution unit executing an operation on data and temporarily storing data, the execution unit having a program counter and a data bus;

a decoder decoding instruction codes read from the instruction register and controlling the instruction register, the timing control unit and the execution unit; and a next enable unit receiving an indication signal indicating proceeding to a next instruction should be performed and controlling outputting of the indication signal to the instruction register and the timing control unit based on first and second signals, the first signal being supplied from the decoder and instructing data on the data bus to be input to the program counter, the second signal being supplied from the execution unit and indicating whether a counter value of the program counter is an odd number or an even number.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 3:
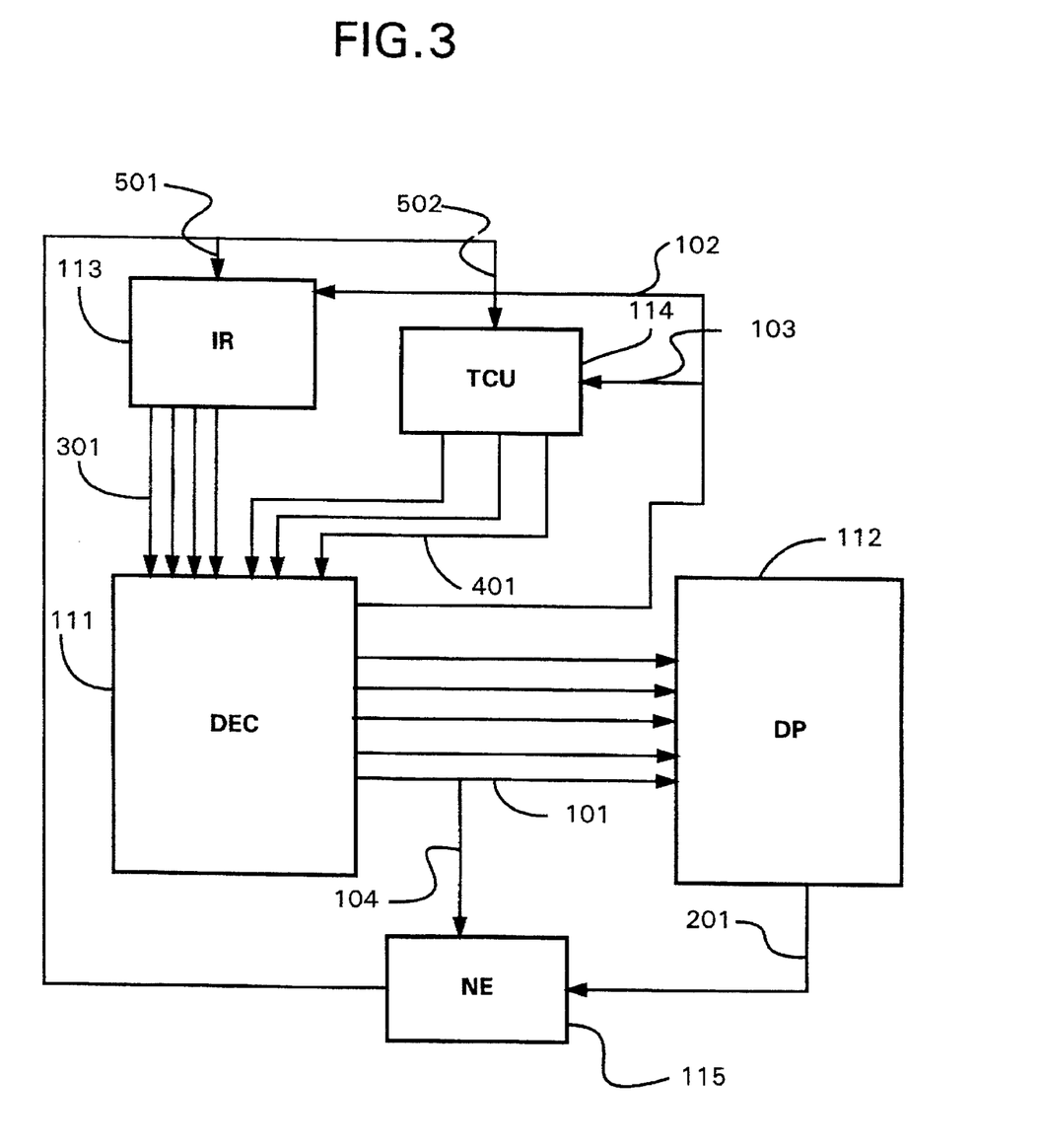
FIG. 3 is a block diagram of a CPU according to an embodiment of the present invention.

FIG. 3 is a block diagram of a CPU according to an embodiment of the present invention. The CPU shown in FIG. 3 is made up of a decoder (DEC) 111, an execution unit (DP) 112, an instruction register (IR) 113, a timing control unit (TCU) 114, and a next enable unit (NE) 115. The decoder 111 is the main control part of the CPU, and has input terminals connected to the output terminals of the instruction register 113 and the timing control unit 114. The output terminals of the decoder 111 are connected to the input terminals of the execution unit 112, the instruction register 113, the timing control unit 114, and the next enable unit 115. The execution unit 112 executes operations on data and temporarily stores data.

The monitor signal 201 produced by the execution unit 112 is output to the next enable unit 115, which generates indication signals 501 and 502 instructing proceeding to the next instruction. The input terminal of the next enable unit 115 is connected to the output terminals of the decoder 111 and the execution unit 112, and the output terminal thereof is connected to the input terminals of the instruction register 113 and the timing control unit 114. The next enable unit 115 instructs, in response to the indication signal 501, that the next instruction code is written into the instruction register 113, and instructs, in response to the instruction signal 502, that the counter value of the timing control unit 114 is set to "0". The control signals 102 and 103 produced by the decoder 111 do not have the functions corresponding to the roles of the indication signals 501 and 502 produced by the next enable unit 115.

The next enable unit 115 is supplied with the control signal 104 output by the decoder 111 and the monitor signal 201 output by the execution unit DP2. The content of the control signal 104 includes the aforementioned control signal "DB_PC" and an instruction "NEXIR", which means "proceed to the next instruction".

When "NEXIR" is instructed by the decoder 111 by means of the control signal 104, the next enable unit 115 refers to the monitor signal 201 and immediately determines whether the counter value of the program counter provided in the execution unit 112 is an odd number or an even number. If the counter value is an odd number, the next enable unit 115 does not send the instruction indicating proceeding to the next instruction to the instruction register 113 and the timing control unit 114. If the counter value is an even number, the next enable unit 155 sends the instruction indicating proceeding to the next instruction to the instruction register 113 and the timing control unit 114.

In the case where the counter value is an odd number, the operation of the CPU does not proceed to the next instruction even when the control signal 104 indicating "NEXIR" is output by the decoder 111, but proceeds, in the next machine cycle, to the next step of the instruction being executed. It will be noted that the next step is a step executed only when the counter value of the program counter is an odd number. Hence, at such an odd number, a microprogram for proceeding to an odd-address exception process is provided.

Figure 4:
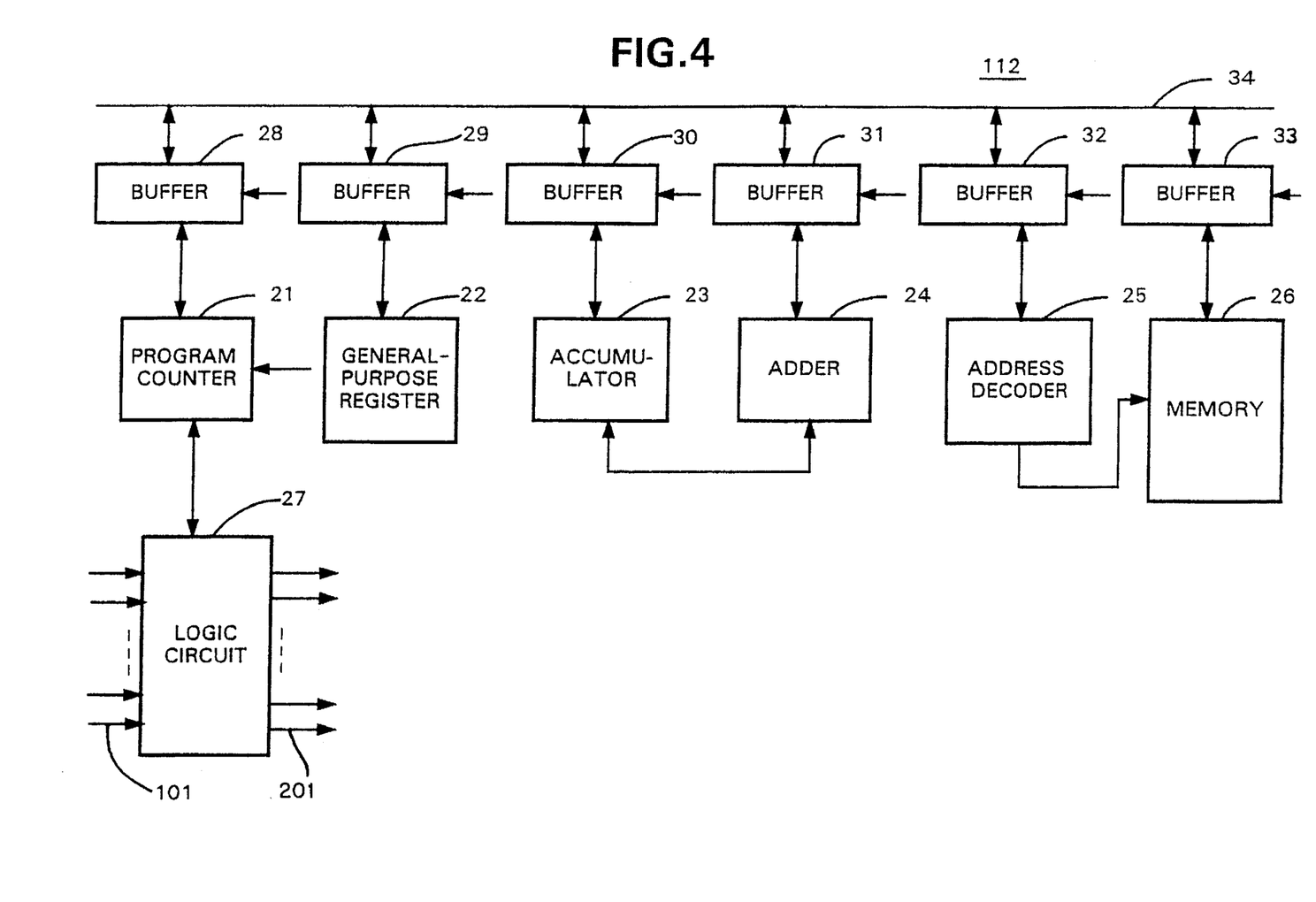
FIG. 4 is a block diagram of an execution unit shown in FIG. 3.

FIG. 4 is a block diagram of an example of the structure of the execution unit 112. As shown in FIG. 4, the execution unit 112 includes a program counter 21, a general-purpose register 22, an accumulator 23, an adder 24, an address decoder 25, a memory 26 and a logic circuit 27. Further, the execution unit 112 includes buffers 28–33 respectively connected to the elements 21–26, which are coupled to a data bus 34 via the buffers 28–33. The data bus 34 is coupled to the instruction register 113 shown in FIG. 3. The logic circuit receives the control signals 101 from the decoder 111 shown in FIG. 3, and generates therefrom internal control signals including the monitor signal 201.

The logic circuit 27 generates the monitor signal 201 by referring to the counter value of the program counter 21. The internal control signals are supplied to the buffers 28–33 and the program counter 21. The program counter 21 performs the count operation in synchronism with the control signal (timing signal) from the logic circuit 27. The control signals 101 show various decoded instructions such as inputting data to the accumulator 23, inputting data to the register 22, storing data in the memory 26 and adding data. In response to these decoded instructions, the logic circuit 27 produces corresponding control (timing) signals.

As has been described previously, the counter value of the program counter 21 is an odd number, the next-instruction proceeding instruction is not transmitted to the instruction register 113 and the timing control unit 114 by the next enable unit 114.

Figure 5:
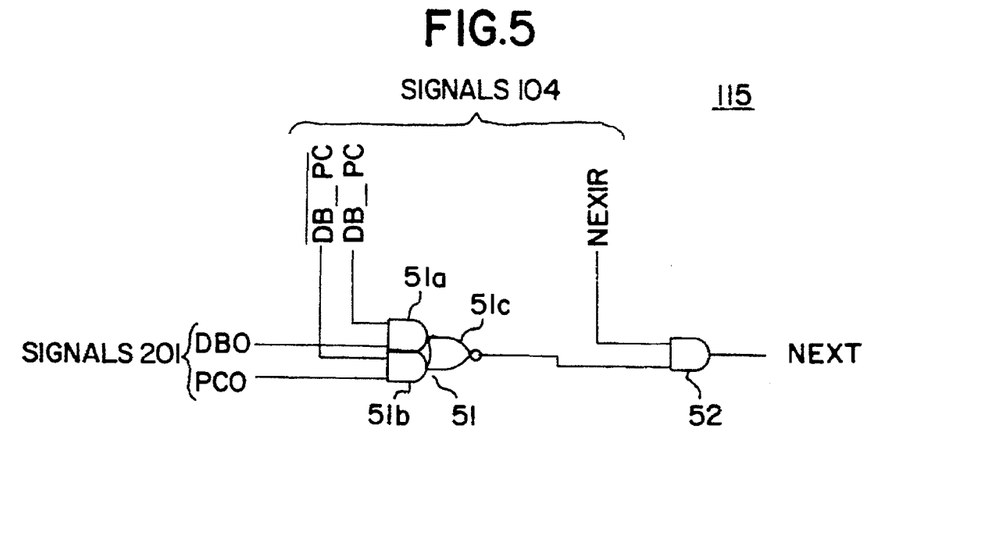
FIG. 5 is a block diagram of a first example of a next enable unit shown in FIG. 3.

FIG. 5 is a block diagram of an example of the structure of the next enable unit 115. The control signals 104 includes the aforementioned control signal DB_PC, its inverted version/DB_PC and the control signal NEXIR. As has been described, the control signal NEXIR indicates "proceed to the next instruction". The monitor signal 201 from the execution unit 112 includes signal DBO and PCO. The signal DBO monitors the least significant bit in the data bus 34 in the execution unit 112. The signal PCO monitors the least significant bit of the counter value of the program counter 21.

The next enable unit 115 shown in FIG. 5 includes a gate 51 corresponding to a first multiplexer, and a gate 52 corresponding to a first selecting unit. The gate 51 is made up of two-input AND circuits 51a and 51b, and a two-input NOR circuit 51c. The AND circuit 51a receives the signals DB_PC and the DBO. The AND circuit 51b receives the signals /DB_PC and the PCO. The NOR circuit 51c receives the output signals of the AND circuits 51a and 51b. The gate 52 is a two-input NAND circuit, which receives the output signal of the gate 51 and the control signal NEXIR.

When the signal DB_PC is high (H) and the signal DBO is high, or when the signal /BP_PC is high and the signal PCO is high, the output signal of the gate 51 is low (L). That is, the output signal of the gate 51 is low when the least significant bit in the data bus 34 is "1" in the case where the decoder 111 outputs the signal DB_PC, that is, when an odd number is supplied to the program counter 21. Further, the output signal of the gate is low when the least significant bit in the data bus 34 is "1" in the case where the decoder 111 does not output the signal DB_PC, that is, when an odd number has been set in the program counter 21. The output signal of the gate 51 is applied to the gate 52.

The gate 52 outputs the high-level signal only when the output signal of the gate 51 and the control signal NEXIR are simultaneously high. The output signal of the gate 52 is labeled "NEXT". The signal NEXT corresponds to the aforementioned indication signals 501 and 502.

Figure 6:
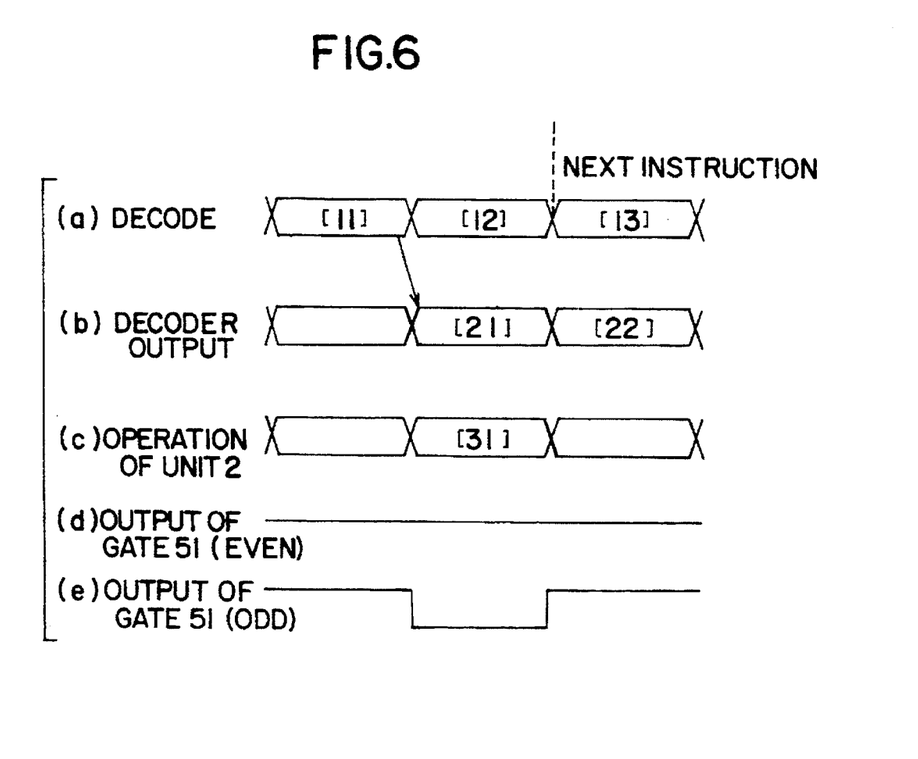
FIG. 6 is a timing chart of the operation of the CPU shown in FIG. 3.

A description will now be given of the operation of the CPU shown in FIG. 3 with reference to a timing chart of FIG. 6. The control signal DB_PC is decoded by the decoder 111 at the operation timing [11] as in the case shown in FIG. 2. The control signal DB_PC is output to the execution unit 112 from the decoder 111 at the timing [21] as in the case shown in FIG. 2. At this time, the gate 51 shown in FIG. 5 operates, and produces the output signal at a timing shown in part (d) of FIG. 6 when the least significant bit DB0 in the internal data bus 34 is "0", that is, indicates an even number. Meanwhile, when the least significant bit DBO in the internal data bus 34 is "1", that is, indicates an odd number, the gate 51 produces the output signal at a timing shown in part (e) of FIG. 6.

The control signal NEXIR is decoded at the timing [12] and is immediately output at the same timing as the timing [31]. However, the control signal NEXIR may not be output according to the output signal of the gate 52. In other words, when an odd number is detected, the control signal NEXIR is neglected. That is, the control signal NEXIR is valid as the signal NEXT only when an even number is detected. In this case, at the timing [31] shown in part (c) of FIG. 6, the next enable unit 115 instructs the instruction register 113 to set the next instruction and instructs the timing control unit 114 to set the counter value to "0". Hence, at the timing [13], the decoding of the next instruction is started.

In the above-mentioned way, the signal DP_PC is decoded at the operation timing [11] and then the next instruction can be processed at the timing [13]. Hence, it is possible to facilitate the program process. Further, one operation step can be removed from the microprogram, and hence the size of the microprogram can be reduced.

In the above-mentioned embodiment of the present invention, a jump to the odd address is detected. However, the above-mentioned concept can be applied to the case where a jump to the jump-inhibited half address space is detected. In this case, the next enable unit 115 having a structure shown in FIG. 7 is employed.

Figure 7:
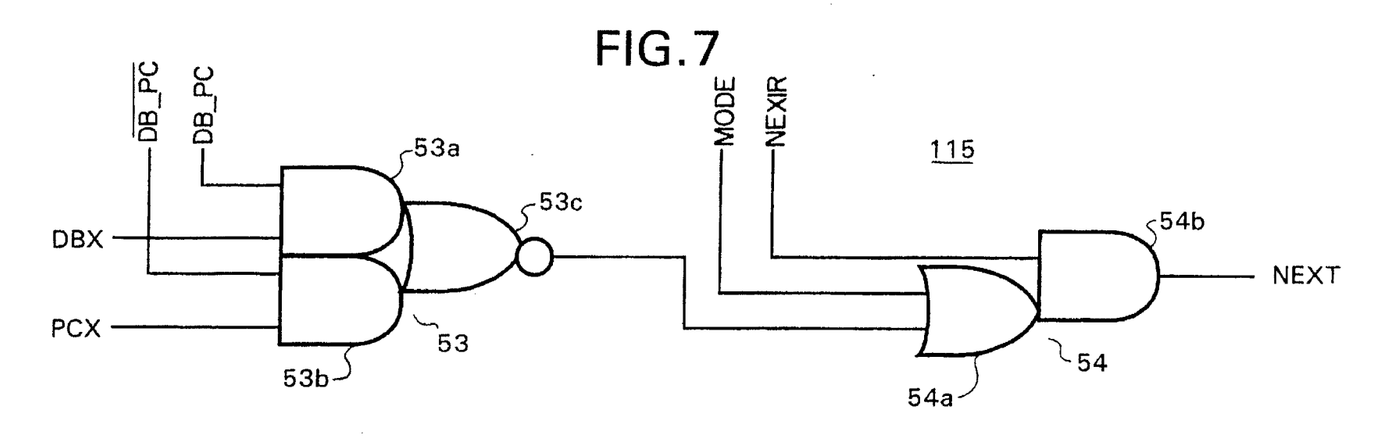
FIG. 7 is a block diagram of a second example of the next enable unit shown in FIG. 3.

The next enable unit 115 shown in FIG. 7 is made up of a gate 53 corresponding to a second multiplexer, and a gate 54 corresponding to a second selecting unit. The gate 53 is made up of two two-input AND circuits 53a and 53b, and a two-input NOR circuit 53c in the same way as the gate 51 shown in FIG. 5. However, the gate 53a receives data DBX of the most significant bit in the internal data bus 34 instead of the signal DB0 shown in FIG. 5, and the gate 53b receives data PCX of the most significant bit of the counter value of the program counter 21 shown in FIG. 4 instead of the signal PC0 shown in FIG. 5. The gate 54 is made up of a two-input OR circuit 54a and a two-input AND circuit 54b. The OR circuit 54a receives the output signal of the gate 53 and an operation mode signal MODE, which will be described later. The AND circuit 54b receives the output signal of the OR circuit f54a and the control signal NEXIR.

When the signal DB_PC is high, the inverted version of the most significant bit DBX in the internal data bus 34 is output by the gate 53. When the inverted version /DB_PC is high, the inverted version of the most significant bit PCX of the counter value of the program counter 21 is output by the gate 53. That is, the output signal of the gate 53 becomes low only when the most significant bit of the address of the jump destination is "1".

The gate 54 outputs the signal NEXT having the same logic as that of the signal NEXIR when either the output signal of the gate 53 or the operation mode signal MODE is high. When the output signal of the gate 53 and the operation mode signal MODE are both low, the gate 54 outputs the low-level signal as the signal NEXT. Hence, there is no limitation regarding the jump destination and no exception process takes place as long as the operation mode signal MODE is high. When the operation mode signal MODE is low, no exception process does not occur if the most significant bit of the address of the jump destination is "0". However, when the most significant bit of the address of the jump destination is "1", the exception process occurs.

It is possible to modify the configuration shown in FIG. 7 so that the exception process occurs when the operation mode signal MODE is low and the most-significant bit of the address of the jump destination is "0". This is accomplished by applying the inverted versions of the signals DBX and PCX to the gate 53.

The operation mode signal MODE, which is supplied from the decoder 111, specifies an operation mode in which there is no restriction to the address when the signal MODE is high, and specifies another operation mode in which there is a restriction to the address when the signal MODE is low. The operation timing of the CPU having the next enable unit shown in FIG. 7 is as shown in FIG. 6.

The above-mentioned concept which has been described with reference to FIGS. 3 through 6 can be applied to the case where the restriction to the address space is controlled by a comparison with an arbitrary value. In this case, the next enable unit 115 having a structure shown in FIG. 8 is employed.

Figure 8:
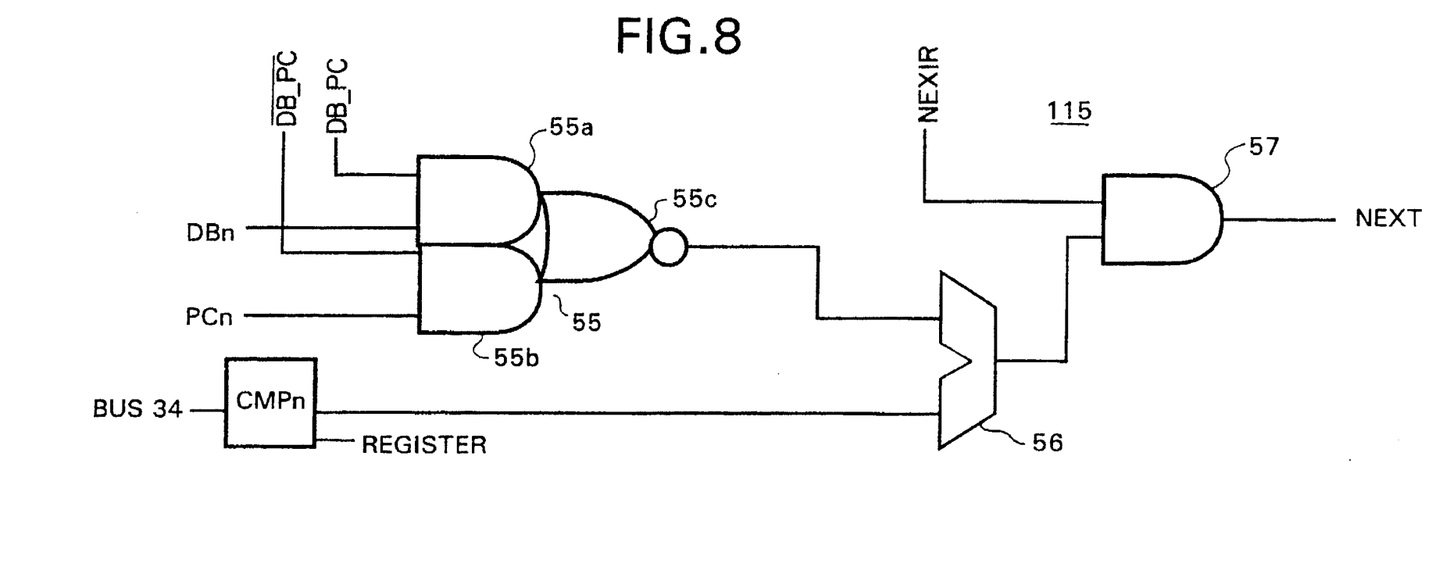
FIG. 8 is a block diagram of a third example of the next enable unit shown in FIG. 3.

The next enable unit 115 shown in FIG. 8 includes a gate 55 corresponding to a third multiplexer, and a gate 57 corresponding to a third selecting unit. The gate 57 is the same as the gate 52 shown in FIG. 5. The gate 55 is made up of two two-input AND gates 55a and 55b, and a two-input NOR gate 55c. The output terminal of the NOR gate 55c is connected to a comparator 56 supplied with an input signal CMPn stored in a register connected to the internal data bus 34. The output terminal of the comparator 56 is connected to one of the two input terminals of the gate 57. The NOR circuit 55c may be replaced by an OR circuit.

Figure 9:
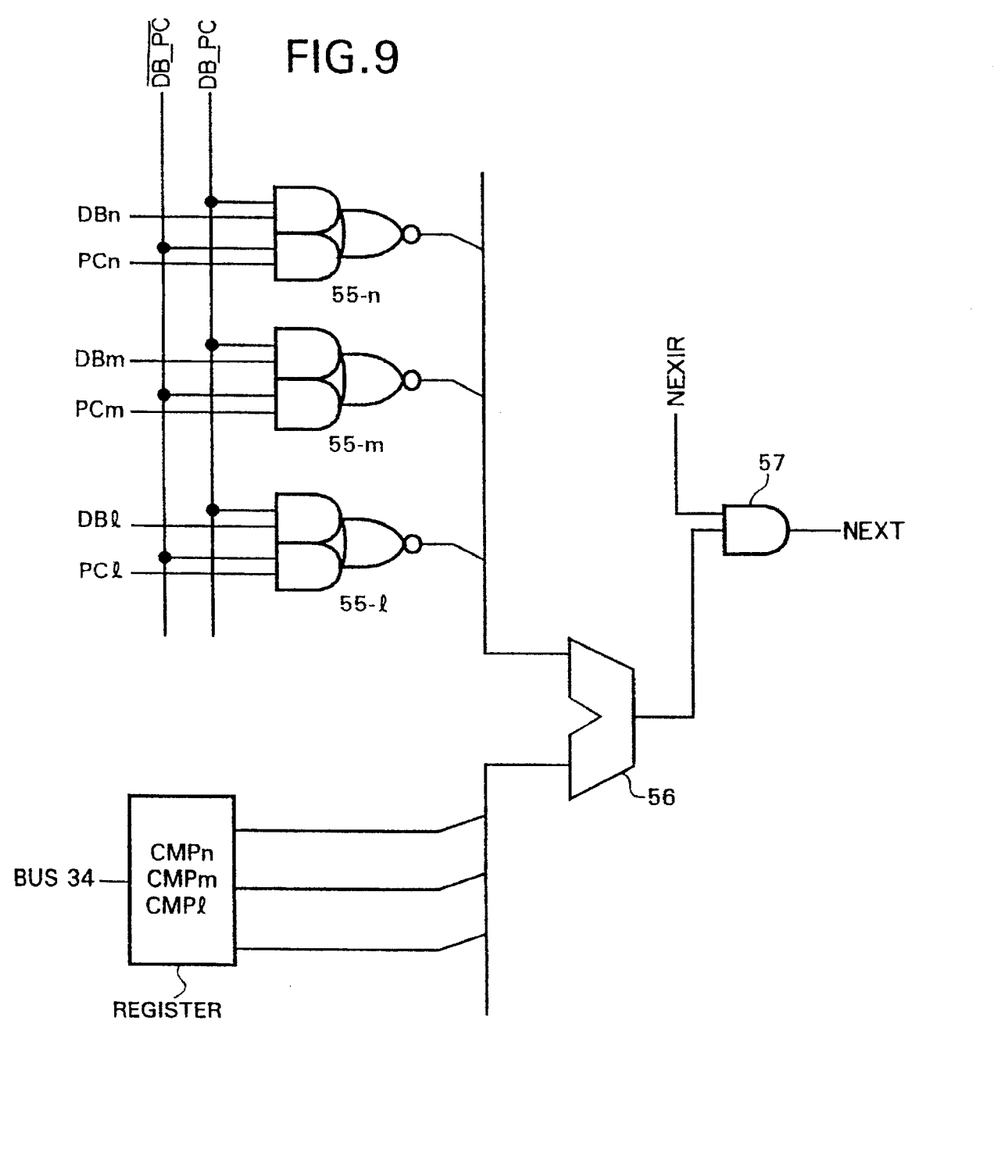
FIG. 9 is a block diagram of a fourth example of the next enable unit shown in FIG. 3.

The next enable unit 115 shown in FIG. 8 operates as follows. Symbols DBn, PCn and CMPn are respectively items of one-bit data in the internal data bus 34, the program counter 21 and a register connected to the bus 34 which stores the compared value, and the n-th digit data thereof (that is, the same digits of the pieces of data). It is possible to provide a structure equal to plural digits although FIG. 8 shows the structure equal to one digit. When processing plural digits, there are provided gates 55 equal in number to the plural digits. FIG. 9 is a block diagram of a structure for processing plural digits.

When the control signal DB_PC is high, the gate 55 outputs the signal DBn. When the control signal /DB_PC is high, the gate 55 outputs the signal PCn. The comparator 56 compares the binarized version of the output signal of the gate 55 with the compared value stored in the register, and outputs its comparison result to the gate 57.

The comparing formation of the comparator 56 can be arbitrarily structured. For example, it is determined whether all the bits to be compared coincide with each other. The comparator 56 outputs the low-level output signal when all the bits are the same as each other, and outputs the high-level output signal when all the bits are not the same. The comparator 56 can compare the output of the gate 55 (jump destination) and the compared value stored in the register.

The gate 57 operates in the same way as the gate 52 shown in FIG. 5. That is, the gate 57 indicates the normal jump when the output signal of the comparator 56 is high, and indicates occurrence of exception when the output signal of the comparator 56 is low. It is also possible to replace the gate 57 by the gate 54 shown in FIG. 7 and refer to the operation mode signal MODE.

The next enable unit 115 shown in FIG. 5 has the following advantages. With the gate 51 shown in FIG. 5 serving as a multiplexer, it is determined whether the address of the branch destination is an odd address or an even address not only by the counter value in the program counter 21 but also by the timing when the counter value before the program counter 21 is updated is available on the data bus 34. The result of the above determination is not used to determine whether the control signal NEXT (indicating proceeding to the next instruction) should be generated, but is used to determine, by the gate 52, whether the already decoded signal NEXIR should be enabled on the basis of the determination result from the gate 51. Hence, the output signal NEXT of the gate 52 can be obtained at an earlier timing.

Hence, the signal NEXT, which is the last step of the operation in instruction processing by the microprogram, can be settled at an earlier timing (one step earlier than the timing obtained in the prior art shown in FIGS. 1 and 2). As a result, it becomes possible to reduce the processing speed of the microprogram and the size of the microprogram.

The next enable unit 115 shown in FIG. 7 has the following advantages. With the gate 53 shown in FIG. 5 serving as a multiplexer, it is determined whether the most significant bit of the address of the branch destination is "0" or "1" not only by the counter value in the program counter 21 but also by the timing when the counter value before the program counter 21 is updated is available on the data bus 34. The result of the above determination is not used to determine whether the control signal NEXT (indicating proceeding to the next instruction) should be generated, but is used to determine, by the gate 54, whether the already decoded signal NEXIR should be enabled on the basis of the determination result from the gate 53. Hence, the output signal NEXT of the gate 54 can be obtained at an earlier timing.

Hence, the signal NEXT, which is the last step of the operation in instruction processing by the microprogram, can be settled at an earlier timing (one step earlier than the timing obtained in the prior art shown in FIGS. 1 and 2). As a result, it becomes possible to reduce the processing speed of the microprogram and the size of the microprogram.

The next enable unit 115 shown in FIG. 8 has the following advantages. With the gate 55 shown in FIG. 5 serving as a multiplexer, it is possible to detect part of the address of the branch destination not only by the counter value in the program counter 21 but also by the timing when the counter value before the program counter 21 is updated is available on the data bus 34. The part of the address of the branch destination is compared with the compared value stored in the register. The result of the above comparison is not used to determine whether the control signal NEXT (indicating proceeding to the next instruction) should be generated, but is used to determine, by the gate 57, whether the already decoded signal NEXIR should be enabled on the basis of the determination result from the gate 55. Hence, the output signal NEXT of the gate 57 can be obtained at an earlier timing.

Hence, the signal NEXT, which is the last step of the operation in instruction processing by the microprogram, can be settled at an earlier timing (one step earlier than the timing obtained in the prior art shown in FIGS. 1 and 2). As a result, it becomes possible to reduce the processing speed of the microprogram and the size of the microprogram.

It will be noted that the signal NEXIR has the same meaning as that of the signal NEXT in the microprogram.

According to the present invention, when executing a branch instruction, the content of the address of the branch destination is checked by referring to not only the monitor signal monitoring whether the program counter value is an odd number or an even number but also the program counter input signal indicating inputting data from the data bus 34 to the program counter 21. Hence, it becomes possible to check the content of the address of the branch destination at the timing when the counter value before the program counter is updated is available on the data bus 34. Further, it becomes possible to send the signal NEXT at an earlier timing because the result of a decision on the monitor signal and the program counter input signal is used to determine whether the signal NEXIR supplied to the next enable unit 115 should be output as the signal NEXT. As a result, it becomes possible to reduce the processing speed of the microprogram and the size of the microprogram.

The present invention is not limited to the specifically described embodiments, and variations and modifications may be made without departing from the scope of the present invention.

What is claimed is:

1. A central processing unit comprising:

an instruction register storing instruction codes;

a timing control unit controlling timings of steps of execution of an instruction;

an execution unit executing an operation on data and temporarily storing data, the execution unit having a program counter and a data bus;

a decoder decoding instruction codes read from the instruction register and controlling the instruction register, the timing control unit and the execution unit; and a next enable unit for providing an indication signal indicating whether proceeding to a next instruction should be performed, and controlling outputting of the indication signal to the instruction register and the timing control unit based on first and second signals, wherein the first signal is supplied from the decoder and indicates that data is on the data bus to be input to the program counter, and the second signal is supplied from the execution unit and indicates whether a counter value of the program counter is an odd number or an even number.

2. The central processing unit as claimed in claim 1, wherein the central processing unit has a restriction which does not allow an instruction to be read starting from an odd address, and wherein the next enable unit comprises:

a multiplexer outputting first information concerning a least significant bit in the data bus when the first signal conforms with said restriction and outputting second information concerning the least significant bit of the counter value of the program counter when the first signal does not conform with said restriction; and a first selecting unit controlling the outputting of said indication signal on the basis of said first information or said second information, the indication signal being output to the instruction register and the timing control unit only when the first information is received.

3. The central processing unit as claimed in claim 1, wherein the central processing unit has a restriction which inhibits an instruction from being read from one of two equally divided parts of an entire memory area of the instruction register, and wherein the next enable unit comprises:

a multiplexer outputting first information concerning a most significant bit in the data bus when the first signal conforms with said restriction and outputting second information concerning the most significant bit of the counter value of the program counter when the first signal does not conform with said restriction; and a second selecting unit controlling the outputting of said indication signal on the basis of said first information or said second information, the indication signal being output to the instruction register and the timing control unit only when the third information is received.

4. The central processing unit as claimed in claim 1, wherein the central processing unit has a restriction in which the counter value of the program counter is compared with a compared value stored in a register, and the operation of the central processing unit is controlled by a comparison result, and wherein the next enable unit comprises:

a first multiplexer outputting first information concerning the data bus when the first signal conforms with said restriction and outputting second information concerning the counter value of the program counter when the first signal does not conform with said restriction; and a selecting unit controlling the outputting of said indication signal on the basis of said first information of said second information, the indication signal being output to the instruction register and the timing control unit only when the second information is received.

5. The central processing unit as claimed in claim 1, wherein:

when the indication signal is not output to the instruction register and the timing control unit, the execution unit executes a next step of an instruction currently being executed; and a microprogram for shifting to an exception process is executed by execution of said next step.

* * * * *